United States Patent [19]

Dodson

[11] Patent Number: 5,340,134
[45] Date of Patent: Aug. 23, 1994

[54] COLLAPSIBLE AND HAND PORTABLE TRAILER

[76] Inventor: Thomas L. Dodson, 730 Bush Dr., Allen, Tex. 75002

[21] Appl. No.: 112,577

[22] Filed: Aug. 25, 1993

[51] Int. Cl.⁵ .......................................... B62D 63/08
[52] U.S. Cl. .................................. 280/37; 280/656; 280/415.1
[58] Field of Search ............... 280/30, 37, 47.18, 401, 280/415.1, 491.1, 491.4, 641, 645, 648, 656, DIG. 11

[56] References Cited

U.S. PATENT DOCUMENTS

| | | | |
|---|---|---|---|
| 2,461,577 | 2/1949 | Stark, Jr. | 280/30 X |
| 4,511,181 | 4/1985 | Schantz | 280/656 X |
| 4,522,425 | 6/1985 | Cornwall et al. | 280/656 |
| 4,746,142 | 5/1988 | Davis | 280/656 |
| 4,758,008 | 7/1988 | Moddejonge | 280/37 |
| 4,768,806 | 9/1988 | Tetreault | 280/656 |
| 4,856,810 | 8/1989 | Smith | 280/37 X |
| 4,906,015 | 3/1990 | LaCroix et al. | 280/415.1 |
| 4,995,129 | 2/1991 | Comardo | 280/656 X |

Primary Examiner—Brian L. Johnson
Attorney, Agent, or Firm—Konneker Bush Hitt & Chwang

[57] ABSTRACT

A hand-carryable trailer and a method for deploying and stowing the same. The trailer comprises (1) a first bed section and a second bed section, the first bed section having a first member for mounting a first wheel axle, the second bed section having a second member for mounting a second wheel axle, (2) at least one member for hingedly joining the first bed section to the second bed section, the joining member allowing the first bed section to pivot relative to the second bed section jointly to form a foldable trailer bed, the foldable trailer bed capable of assuming an extreme open position wherein upper surfaces of the first bed section and the second bed section are substantially co-planar and an extreme closed position wherein the first bed section and the second bed section cooperate to form a cavity therebetween, the first and second mounting members located at distal sides of the trailer when the trailer is in the extreme open position, (3) a first wheel member joined to the first bed section with the first wheel axle and a second wheel member joined to the second bed section with the second wheel axle and (4) a tongue member coupled to the trailer bed and capable of coupling the trailer to a towing vehicle. Preferably, the towing vehicle is an all-terrain vehicle ("ATV").

22 Claims, 2 Drawing Sheets

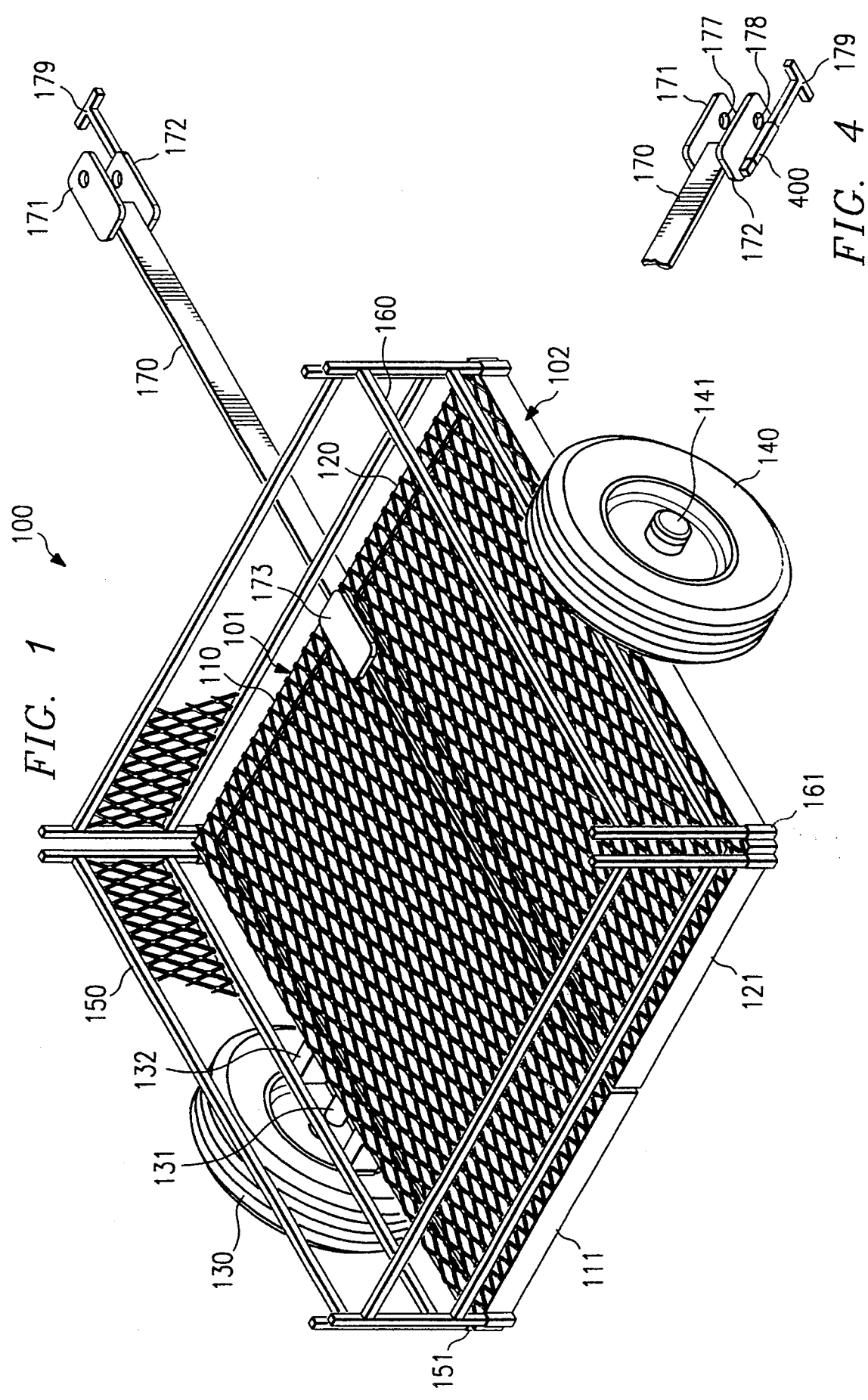

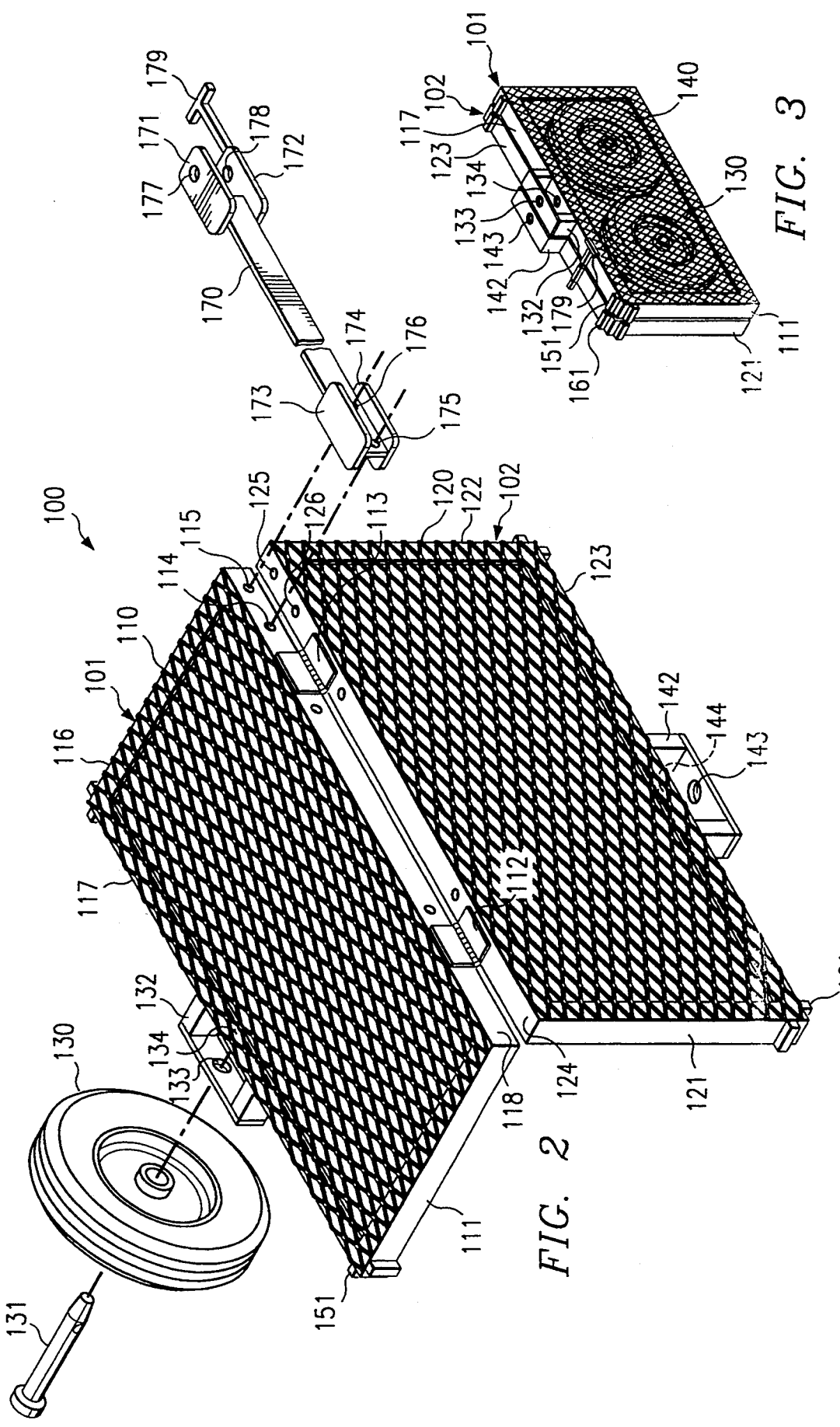

COLLAPSIBLE AND HAND PORTABLE TRAILER

TECHNICAL FIELD OF THE INVENTION

The present invention is directed, in general, to towable trailers and, more specifically, to light duty trailers for use with all-terrain vehicles ("ATVs") and the like that can be folded and hand carried when not in use.

BACKGROUND OF THE INVENTION

For years, trailers have been employed to carry loads either too large, too heavy or otherwise not appropriate to carry within a single vehicle. These prior art trailers comprise a flat bed or walled body to which is fixed one or more wheeled axles. A tongue or other structure is fixed to the bed or body as an interface to allow the trailer to couple to a towing vehicle.

Conventional trailers are desirably configured for use. However, it is common to stow or store a trailer when not in use, rather than to leave it attached to the towing vehicle. Unfortunately, conventional trailers tend to be bulky and heavy, taking up room however they are stored.

One solution to the above-noted problem has been provided by a flatbed trailer that folds in half along a line extending from side to side and stands vertically on a set of dedicated wheels attached to a metal frame. The wheels and frame hold the trailer in a vertical orientation and allow the trailer to be rolled to its storage place. Unfortunately, this arrangement suffers several disadvantages. First, the dedicated wheels and frame remain on the trailer even when it is in use, somewhat impeding access to the flatbed. Second, apart from folding in the middle and at the tongue, the trailer does not otherwise readily disassemble. Therefore, the trailer is still large and somewhat unwieldy. Third, the trailer has a high center of gravity and thus tend to be unstable when it is placed in its vertical, storing position. This limits its portability and demands extra care on the part of the person moving the trailer- Finally, once the trailer is placed horizontal and unfolded for operation, the trailer has no structure for retaining it in the unfolded position. Thus, although gravity acts to keep the trailer unfolded, shaking while the trailer is in motion may cause the bed to temporarily fold slightly.

An ATV is a small vehicle designed primarily for off-road use by a single person. ATVs are provided with either three or four large, balloon-like tires designed to traverse soft surfaces and a small engine similar to those found on motorcycles. They are particularly popular with hunters, ranchers, farmers, naturalists and others who, for either work or pleasure, want to go where other vehicles are ill-suited to take them. ATVs are generally provided with a trailer hitch in the form of a horizontal member having a bore therein protruding from the backside of the ATV. A trailer to couple to this hitch must have a pair of parallel horizontal members with aligned bores therein and a gap between the members into which the piece of metal on the ATV is inserted. A single metal pin is inserted through the bores in all three of the members locking them together in a somewhat flexible manner, allowing the ATV and the trailer to rotate with respect to each other about the pin to a limited extent.

The non-folding trailer described above has been made smaller to fit on the back of an ATV. However, one may not always wish to have the trailer attached to the ATV. So often trailers are only needed one way on a round trip. For instance, a hunter may set out with only a gun and some ammunition (not requiring a trailer) and return with a slain deer (requiring a trailer). A rancher may set out with a trailer-load of fence-building supplies and return empty-handed. Thus, it would be highly advantageous to provide a trailer that is collapsible to the extent that it can be carried along on the ATV itself and deployable to be attached to the ATV as any normal trailer. Preferably, the trailer should be collapsible into a single unit, rather than as a collection of parts, making it even more portable. The prior art has failed to produce such a trailer.

SUMMARY OF THE INVENTION

To address the above-noted deficiencies of the prior art, it is a primary object of the present invention to provide a relatively lightweight, light-duty trailer for ATVs and the like that is disassemblable and foldable into a hand-carryable case. In the attainment of the above primary object, the present invention provides a trailer comprising (1) a first bed section and a second bed section, the first bed section having a first means for mounting a first wheel axle, the second bed section having a second means for mounting a second wheel axle, (2) means for hingedly joining the first bed section to the second bed section, the joining means allowing the first bed section to rotate relative to the second bed section jointly to form a foldable trailer bed, the foldable trailer bed capable of assuming an extreme open position wherein upper surfaces of the first bed section and the second bed section are substantially co-planar and an extreme closed position wherein the first bed section and the second bed section cooperate to form a cavity therebetween, the first and second mounting means located at distal sides of the trailer when the trailer is in the extreme open position, (3) a first wheel member joined to the first bed section with the first wheel axle and a second wheel member joined to the second bed section with the second wheel axle and (4) a tongue member coupled to the trailer bed and capable of coupling the trailer to a towing vehicle. In a preferred embodiment, the towing vehicle is an all-terrain vehicle.

The advantage of this structure is that the bed of the trailer also serves as the case, eliminating a need for a separate case. The case is adapted to carry at least the wheel assemblies and, in other embodiments, the remaining part of the trailer, such that it becomes compact and entirely portable.

In a preferred embodiment, the trailer comprises a tongue means for connecting the trailer to a towing vehicle, the tongue means coupled to the first bed member at a point proximate the first front edge. The tongue means is preferably fully detachable to allow for more compact storage of the disassembled trailer, although the tongue can just as well be pivotally mounted to the trailer bed to allow it to pivot to within the cavity for storage therein. In a preferred embodiment, the tongue means is connectable to both the first and second bed members by a pair of bolts in a manner to be described later so as to retain the first and second bed members in the open position. Thus, the tongue means provides the dual advantage of keeping the trailer from folding up during use and coupling the trailer to the towing vehicle.

It is apparent that the trailer as described above has a flat bed that, in one embodiment, comprises a plurality of side members having a substantially right-angled cross section joined in a substantially co-planar rectangular configuration and substantially planar sheet members bonded to each of the side members, the side members forming edges normal to a plane of the sheet members to lend structural rigidity thereto. In one embodiment of the present invention, railing members are coupled to the first and second bed members at a point proximate the first and second outer edges. The railing members provide side walls for the trailer, limiting lateral movement of objects loaded on the trailer while the trailer is in motion. These railing members may be provided on one or both sides of the trailer and in the front or back of the trailer, as desired. The railing members can be provided with a mesh screen to further inhibit lateral movement of smaller objects carried on the trailer.

In a preferred embodiment, the first and second upper surfaces comprise a mesh screen. By using a mesh screen instead of a solid planar sheet of material, the weight of the trailer is reduced and fluid that may collect on the upper surface can be allowed to drain through the holes in the mesh screen. Furthermore, the mesh screen also allows visual inspection of the contents of the cavity when the trailer is in the closed position.

A key feature of the present invention is the means by which the wheel assemblies are supported. There is no common axle joining one wheel to the other. Since the wheels are offset from the axle supports, the axle supports must counteract the torque that results from this offset. Accordingly, the present invention preferably provides first and second wheel assembly supports joined to and protruding outwardly from the first and second outer edges, respectively, the first and second wheel assembly supports including bores therein adapted to receive the axles therethrough when the first and second bed members are in the open position. The axles pass through these bores and through axially-aligned bores in the first and second outer edges, giving sufficient strength to the axle support. As an added advantage, the first and second wheel assembly supports also cooperate to form a handle for manual carriage of the trailer when the first and second bed members are in the closed position.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates an isometric view of the portable trailer of the present invention in an open, fully assembled position;

FIG. 2 illustrates a partial, exploded isometric view of the portable trailer of FIG. 1;

FIG. 3 illustrates an isometric view of the portable trailer of FIG. 1 in a closed, fully stowed position; and FIG. 4 illustrates a partial underside view of the tongue member showing, in particular, a handle for hand towing of the portable trailer of FIG. 1.

DETAILED DESCRIPTION

Referring initially to FIG. 1, illustrated is an isometric view of the portable trailer of the present invention in an open, fully assembled position. The portable trailer, generally designated 100, comprises a first bed section 101 and a second bed section 102. The first bed section 101 may comprise a substantially planar sheet member and comprises, in a preferred embodiment, a mesh screen 110 over a plurality of side members. The side members have a substantially right-angled cross section and are joined in a substantially co-planar rectangular configuration as shown in FIG. 1. This structure results in formation of a plurality of edges normal to a plane of the mesh screen (and downward-pointing as shown in FIG. 1) to lend structural rigidity to the first bed member 101. In a like fashion, the second bed member 102 has a plurality of side members that likewise form a frame onto which a substantially planar sheet member or, preferably, a mesh screen 120 is bonded. A first wheel assembly 130 is joined to the first bed member by an axle 131 passing through a bore in a first wheel assembly support 132 and through another bore (not shown in FIG. 1) in an outer edge of a side member of the first bed member 101. The first wheel assembly support is joined to and protrudes outwardly from the first outer edge lending structural integrity to mounting of the first wheel assembly 130 to the first bed member 101.

In like fashion, a second wheel assembly 140 is mounted to the second bed member 102. A second axle joining the second wheel assembly to the second bed member terminates in an end 141 captured in a hub of the wheel assembly 140, as shown.

A first railing member 150 and a second railing member 160 are adapted to engage with corresponding first channel members 151 and second channel members 161 to allow the railing members 150,160 to form a restraint on the trailer 100 as against lateral movement of any cargo carried thereon. Also shown are front and rear railing members engaged with corresponding channel members. All of the railing members 150, 160 (and those not referenced) are removable to allow compact storage of the trailer 100. The railing members are preferably fitted with a mesh screen to form a wall as against lateral movement of all but the smallest objects.

A tongue member 170 allows the trailer 100 to be coupled to a towing vehicle (not shown). The tongue member is connectable to the first bed member 101 and the second bed member 102 in a space therebetween to be described more fully in conjunction with FIG. 2. The tongue member 170 comprises a first plate 171 and a second plate 172 mounted to one end of the tongue member 170. The plates 171, 172 have co-axial bores therein adapted to receive a pin (not shown) therethrough. As explained above, the pin that passes through these bores further passes through a bore in a hitch member that protrudes from a backside of the towing vehicle. Forces emanating from the towing vehicle pass through this pin and to the trailer 100 to allow the trailer 100 to be pulled along. When the trailer is in its open position but is not hitched to a towing vehicle, a handle 179 can be fed through a channel member (shown in FIG. 4 as a channel member 400) welded to an underside of the second plate 172 and locked therein in a conventional manner to provide a handle suitable for pulling the trailer by hand.

An upper plate 173 and a corresponding lower plate (not shown in FIG. 1) cooperate to maintain the first and second bed members 101, 102 in substantially co-planar alignment with one another, thereby maintaining the trailer 100 in the open position, as shown. The tongue member 170 is attached to the first and second bed members 101, 102 by pins passing through inner edges of the first and second members 101, 102 and the tongue member 170 in a manner to be shown in more detail in FIG. 2.

Turning now to FIG. 2, illustrated is a partial, exploded isometric view of the portable trailer of FIG. 1. The first bed member 101 has a first rear edge 111, a first front edge 116, a first outer edge 117 and a first inner edge 118. In a like fashion, the second bed member 102 has a second rear edge 121, a second front edge 122, a second outer edge 123 and a second inner edge 124. The first bed member 101 is joined in a pivotal fashion to the second bed member 102 by a plurality of hinge members 112, 113, the hinge members 112, 113 comprising a means for pivotally coupling the first bed member 101 to the second bed member 102. The hinge members 112, 113 are located proximate the first and second outer edges 118, 124. The first and second hinge members 112, 113 allow the first and second bed members 101, 102 to be rotated relative to one another to allow the bed members 101, 102 to assume (1) an open position wherein the first outer edge 117 is distal from the second outer edge 123 and the first and second mesh screens 110, 120 are substantially co-planar (as is shown in FIG. 1) and (2) a closed position wherein the first outer edge 117 is proximate the second outer edge 123 (as will be shown in FIG. 3). In this configuration, inner surfaces of the first and second wire mesh 110, 120 cooperate to form opposite walls of a storage cavity within the first and second bed members 101, 102. The first and second rear, front, outer and inner edges 111, 116, 117, 118, 121, 122, 123, 124 likewise cooperate to form side walls of this cavity. The first wheel assembly support 132 is adapted to receive an axle 131 through a bore 133 therein. The axle 131 further passes through a bore 134 in the first outer edge 117 of the first bed member 101. It is important to not that, since the first wheel assembly 130 is cantilevered outward with respect to the first bed member 101 that, during operation of the trailer 100, a torque is developed through the axle 131, acting as a lever arm. Accordingly, the first wheel assembly support 132 cooperates with the first outer edge 117 and the respective bores 133, 134 therein to counteract this torque, lending rigidity to mounting of the axle 131. In a like fashion, bores 143 and 144 in the second wheel assembly support 142 and second outer edge 123 cooperate to lend rigidity to support of the second wheel assembly (not shown in FIG. 2). The tongue member 170 is shown again as comprising first and second plates 171, 172 having corresponding, coaxial bores therein 177, 178 adapted to accept a pin therethrough. The tongue member 170 has a pair of bores 175, 176 therein that correspond to bores 114, 115 in the first inner edge 118 and bores 125, 126 in the second inner edge 124. After the first bed member 101 and the second bed member 102 are opened withrespect to one another, the hinge members 112, 113 produce a gap between the first and second inner edges 118, 124 sufficient to allow the tongue member 170 to be slid therebetween- The bores 114, 175, 126 align, as do the bores 115, 176, 125. Pins (not shown) are made available to slide therethrough to lock the first and second bed members 101, 102 in the open position and to fix the tongue member 170 to the first and second bed members 101, 102. Other pins can slide through other bores in the first and second inner edges 118,124 to further lock the first and second bed members 101, 102 in their open position. The upper plate 173 and a lower plate 174 of the tongue member 170 further keep the first and second bed members 101, 102 from rotating with respect to one another by providing a travel limit stop. Again, the handle 179 is shown as coupled to the tongue member 170 for hand-towing.

Turning now to FIG. 3, illustrated is an isometric view of the portable trailer 100 of FIG. 1 in a closed, fully stowed position. Therefore, FIG. 3 illustrates a view of the present invention in its highly compact, easily portable and self-contained form. The first and second bed members 101, 102 cooperate to form a cavity therebetween suitable for receiving the first and second wheel assemblies 130, 140 and other parts of the trailer 100 including, but not limited to, axles and pins necessary for assembling the trailer 100. In one embodiment of the present invention, the tongue member 170 and the railing members 150, 160 of FIG. 1 can also be stowed within the cavity formed by the first and second bed members 101, 102.

In the closed position, the channel members 151, 161 align to allow a pin to pass therethrough, locking the first and second bed members 101, 102 into the closed position. In one embodiment, one of the pins used during assembly of the trailer 100 could be used for this purpose also. Further, the first and second wheel assembly supports 132, 142 align with respect to one another and form a convenient handle for manual carriage of the trailer in its closed, "suitcase" position. It is of particular interest to note that the first and second wheel assembly supports 132, 142 are substantially centered longitudinally with respect to the first and second bed members 101, 102. This lends two advantages. First, when the trailer 100 is in an open position, the wheel assemblies 130, 140 support the trailer at a substantially central location which, most often, is proximate the center of gravity of cargo placed on the trailer. Second, in the closed position, the handle formed by the first and second wheel assembly supports 132, 142 are again substantially in alignment with the center of gravity of the trailer 100 "suitcase" for the comfort and convenience of the user. The handle 179, in addition to serving in a hand-towing capacity, also can serve to hold the first and second bed members 101, 102 in their closed position by being passed through a pair of corresponding channel members mounted on the first and second outer edges 117, 123. A conventional pin can be used to hold the handle 179 in place and thereby secure the "suitcase" against unwanted opening.

The mesh screen 110, 120 serves a variety of purposes. First, it is lightweight. By eliminating much of the material that would otherwise be required if the wire mesh were instead a solid member, the trailer 100 is made lighter. Second, fluids that may come from the cargo carried by the trailer 100 are allowed to drip through the mesh screen 100, thereby perhaps limiting corrosion or other damage to the trailer 100. Finally, as shown in FIG. 3, the mesh screen 110, 120 allows visual inspection of the contents of the cavity of the trailer 100 when in its closed position. This results in greater convenience for the user.

Those skilled in the art should find it apparent that the first and second bed members 101, 102 may be formed of any substantially rigid material, such as metal or plastic. In fact, in a preferred embodiment, the mesh screen 110, 120 is formed of plastic and is bonded by conventional techniques to aluminum side members. In this embodiment, the first and second wheel assembly supports 132, 142 are likewise aluminum. It is also possible that the first and second bed members 101, 102 may be entirely made of steel. The first and second bed members 101, 102 can also be made entirely of plastic or aluminum. Other materials may be suitable also, depending upon weight-carrying requirements for the trailer 100.

Those skilled in the art should understand that the tongue member 170 need not terminate in plates 171, 172, as shown, but can terminate in a conventional ball hitch arrangement. Further, the trailer 100 of the present invention can be outfitted with lights and a license plate in the conventional manner to allow use of the trailer on a public roadway.

The first and second wheel assemblies 130, 140 are of conventional construction for general trailer use and are readily available.

From the above, it is apparent that the present invention provides a trailer comprising (1) a first bed section and a second bed section, the first bed section having a first means for mounting a first wheel axle, the second bed section having a second means for mounting a second wheel axle, (2) means for hingedly joining the first bed section to the second bed section, the joining means allowing the first bed section to rotate relative to the second bed section jointly to form a foldable trailer bed, the foldable trailer bed capable of assuming an extreme open position wherein upper surfaces of the first bed section and the second bed section are substantially co-planar and an extreme closed position wherein the first bed section and the second bed section cooperate to form a cavity therebetween, the first and second mounting means located at distal sides of the trailer when the trailer is in the extreme open position, (3) a first wheel member joined to the first bed section with the first wheel axle and a second wheel member joined to the second bed section with the second wheel axle and (4) a tongue member coupled to the trailer bed and capable of coupling the trailer to a towing vehicle.

Although the present invention and its advantages have been described in detail, it should be understood that various changes, substitutions and alterations can be made herein without departing from the spirit and scope of the invention as defined by the appended claims.

What is claimed is:

1. A trailer, comprising:
   a detachable first wheel assembly;
   a first bed member having a first upper surface, a first lower surface, a first front edge, a first inner edge, a first outer edge and first means for joining said first wheel assembly to said first bed member, said first joining means located proximate said first outer edge;
   a second bed member having a second upper surface, a second lower surface, a second inner edge and a second outer edge;
   means for pivotally coupling said first bed member to said second bed member, said coupling means located proximate said first and second inner edges, said first and second bed members thereby capable of assuming (1) an open position wherein said first outer edge is distal from said second outer edge and said first and second upper surfaces are substantially co-planar and (2) a closed position wherein said first outer edge is proximate said second outer edge and said first lower surface and said second lower surface cooperate to form interior walls of a storage cavity, said storage cavity for receiving said first wheel assembly for transportation therein, said first joining means comprising a first wheel assembly support joined to and protruding outwardly from said first outer edge, said first wheel assembly support including a bore therein adapted to receive an axle therethough when said first and second bed members are in said open position, said first wheel assembly support providing a gripping portion forming a handle for manual carriage of said trailer when said first and second bed members are in said closed position.

2. The trailer as recited in claim 1 further comprising a tongue means for connecting said trailer to a towing vehicle, said tongue means coupled to said first bed member at a point proximate said first front edge.

3. The trailer as recited in claim 1 further comprising a railing member coupled to said first bed member at a point proximate said first outer edge.

4. The trailer as recited in claim 1 wherein said first inner, outer and front edges are substantially planar surfaces oriented substantially normal to a plane of said first bed member.

5. The trailer as recited in claim 1 wherein said first upper surface comprises a mesh screen.

6. The trailer as recited in claim 1 wherein said first bed member comprises:
   a plurality of side members having a substantially right angled cross section joined in a substantially co-planar rectangular configuration; and
   a substantially planar sheet member bonded to each of said side members, said side members forming edges normal to a plane of said sheet member to lend structural rigidity thereto.

7. The trailer as recited in claim 1 wherein said coupling means comprises a hinge.

8. The trailer as recited in claim 1 wherein a tongue means for coupling said trailer to a towing vehicle is connectable to said first and second bed members, said tongue means fixing said first and second bed members in said open position.

9. The trailer as recited in claim 1 further comprising a channel member joined to said first outer edge and adapted to receive a railing member therein, said railing member forming a restraint on said trailer.

10. A method of deploying a collapsible trailer, comprising the steps of:
   removing a first wheel assembly from a storage location in a cavity formed between a first bed member and a second bed member;
   pivoting said first bed member relative to said second bed member from a closed position to an open position by rotating a pivotal coupling joining a first inner edge of said first bed member to a second inner edge of said second bed member, upper surface of said first and second bed members becoming substantially co-planar to form a trailer bed, a first outer edge of said first bed member becoming distal from a second outer edge of said second bed member, said first outer edge including a first means for joining a first wheel assembly to said first bed member, said first joining means comprising a first wheel assembly support joined to and protruding outwardly from said first outer edge, said first wheel assembly support including a bore therein adapted to receive an axle therethrough when said first and second bed members are in said open position, said first wheel assembly support providing a gripping portion forming a handle for manual carriage of said trailer when said first and second bed members are in said closed position; and joining said first wheel assembly to said first joining means.

11. The method as recited in claim 10 further comprising the step of connecting a tongue means, for coupling said trailer to a towing vehicle, to said first bed member at a point proximate said first front edge.

12. The method as recited in claim 10 further comprising the step of coupling a railing member to said first bed member at a point proximate said first outer edge.

13. The method as recited in claim 10 wherein said step of pivoting comprises the step of pivoting said first bed member relative to said second bed member from said closed position to said open position by rotating said pivotal coupling joining said first inner edge of aid first bed member to said second inner edge of said second bed member, said first inner and outer edges being substantially planar surfaces oriented substantially normal to a plane of said first bed member.

14. The method as recited in claim 10 wherein said step of pivoting comprises the step of pivoting said first bed member relative to said second bed member from said closed position to said open position by rotating said pivotal coupling joining said first inner edge of said first bed member to said second inner edge of said second bed member, said upper surfaces of said first and second bed members becoming substantially co-planar to form said trailer bed, said upper surfaces comprising mesh screen.

15. The method as recited in claim 10 wherein said step of removing comprises the step of removing a first wheel assembly from a storage location in a cavity formed between a first bed member and a second bed member, said first bed member comprising:

a plurality of side members having a substantially rightangled cross section joined in a substantially co-planar rectangular configuration; and a substantially planar sheet member bonded to each of said side members, said side members forming edges normal to a plane of said sheet member to lend structural rigidity thereto.

16. The method as recited in claim 10 wherein said step of pivoting comprises the step of pivoting said first bed member relative to said second bed member from said closed position to said open position by rotating said pivotal coupling joining said first inner edge of said first bed member to said second inner edge of said second bed member, said pivotal coupling comprising a hinge.

17. The method as recited in claim 10 further comprising the step of connecting a tongue means, for coupling said trailer to a towing vehicle, to said first and second bed members, said tongue means fixing said first and second bed members in said open position.

18. The method as recited in claim 10 further comprising the step of placing a railing member into a channel member joined to said first outer edge, said railing member forming a lateral restraint on said trailer.

19. A hand-carryable trailer, comprising:

a detachable first wheel assembly including a wheel and an axle;

a rectangular first bed member having first upper and lower surfaces, first front, rear, inner and outer edges and first means for joining said first wheel assembly to said first bed member, said first joining means located proximate said first outer edge and a preselected distance from said first rear edge, said first front, rear, inner and outer edges having surfaces normal to a plane of said first upper surface to lend structural rigidity to said first bed member;

a detachable second wheel assembly including a wheel and an axle;

a second bed member having second upper and lower surfaces, second front, rear, inner and outer edges and second means for joining said second wheel assembly to said second bed member, said second joining means located proximate said second outer edge and substantially said preselected distance from said second rear edge, said second front, rear, inner and outer edges having surfaces normal to a plane of said second upper surface to lend structural rigidity to said second bed member;

a hinge pivotally joining said first bed member to said second bed member, said coupling means located proximate said first and second inner edges, said first and second bed members thereby capable of assuming (1) an open position wherein said first outer edge is distal from said second outer edge and said first and second upper surfaces are substantially co-planar and (2) a closed position wherein said first outer edge is proximate said second outer edge and said first lower surface, said second lower surface said surfaces of said first and second front, rear, inner and outer edges cooperate to form walls of a storage cavity for receiving said first and second wheel assemblies for transportation therein;

a first wheel assembly support joined to and protruding outwardly from said first outer edge, said first wheel assembly support and said first outer edge including substantially axially-aligned bores therein adapted to receive said axle of said first wheel assembly therethrough when said first and second bed members are in said open position;

a second wheel assembly support joined to and protruding outwardly from said second outer edge, said second wheel assembly support and siad second outer edge including substantially axially-aligned bores therein adapted to receive said axle of said second wheel assembly therethrough when siad first and second bed members are in said open position, said first and second wheel assembly supports providing a gripping portion forming a handle for manual carriage of said trailer when said first and second bed members are in said closed position; and a tongue member for coupling said trailer to a towing vehicle, said tongue member connectable to said first and second inner edges proximate said first and second front edges, said tongue member fixing said first and second bed members in said open position.

20. The trailer as recited in claim 19 further comprising a plurality of channel members joined to said first and second outer edges and adapted to receive railing members ,therein, said railing members forming restraints on said trailer.

21. The trailer as recited in claim 19 wherein said first and second upper surfaces are formed of plastic.

22. The trailer as recited in claim 19 wherein said first and second upper surfaces are formed of meshed material.

* * * * *

UNITED STATES PATENT AND TRADEMARK OFFICE
CERTIFICATE OF CORRECTION

PATENT NO. : 5,340,134
DATED : August 23, 1994
INVENTOR(S) : Thomas L. Dodson

Page 1 of 2

It is certified that error appears in the above-indentified patent and that said Letters Patent is hereby corrected as shown below:

Col. 1, line 40     "-" should be --,--.

Col. 1, line 59     "members" should be -- member --.

Col. 5, line 49     "not" should be --note--.

Col. 5, lines 67-68 "withrespect" should be --with respect--.

Col. 6, line 3     "-" should be --,--.

Col. 9, line 19     "," should be deleted.

UNITED STATES PATENT AND TRADEMARK OFFICE
CERTIFICATE OF CORRECTION

PATENT NO. : 5,340,134
DATED : August 23, 1994
INVENTOR(S) : Thomas L. Dodson

It is certified that error appears in the above-indentified patent and that said Letters Patent is hereby corrected as shown below:

Column 9, line 29, "aid" should be --said --.

Column 10, line 53, "siad" should be --said --.

Column 10, line 57, "siad" should be --said --.

Column 11, line 5, "," should be deleted.

Signed and Sealed this

Twenty-fifth Day of April, 1995

Attest:

BRUCE LEHMAN

Attesting Officer

Commissioner of Patents and Trademarks